(12) United States Patent
Sugata et al.

(10) Patent No.: US 6,963,589 B1
(45) Date of Patent: Nov. 8, 2005

(54) INFORMATION PROCESSING APPARATUS FOR AND METHOD OF TRANSMITTING AND/OR RECEIVING BROADCAST SIGNAL

(75) Inventors: Masao Sugata, Yokohama (JP); Haruo Uchiyama, Yokohama (JP); Kenichi Nagasawa, Kawasaki (JP); Nobukuni Roppongi, Yokohama (JP); Toru Fukumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/108,357

(22) Filed: Jul. 1, 1998

(30) Foreign Application Priority Data

| Jul. 3, 1997 | (JP) | ................................. 9-178196 |
| Jul. 4, 1997 | (JP) | ................................. 9-179553 |
| Sep. 29, 1997 | (JP) | ................................. 9-263764 |

(51) Int. Cl.[7] .............................................. H04J 3/04
(52) U.S. Cl. ..................................... 370/535; 714/758
(58) Field of Search ............................ 370/349, 389, 370/465, 471, 474, 480, 535, 537, 540; 714/758, 714/798, 799; 375/265, 262

(56) References Cited

U.S. PATENT DOCUMENTS

| 5,072,297 A | * | 12/1991 | Kanazawa et al. .......... 358/143 |
| 5,148,272 A | * | 9/1992 | Acampora et al. .......... 358/133 |
| 5,172,380 A | * | 12/1992 | Odaka .......................... 371/37 |
| 5,189,673 A | * | 2/1993 | Burton et al. ............. 370/110.1 |
| RE35,101 E | * | 11/1995 | Kelly ........................... 370/84 |
| 5,524,194 A | * | 6/1996 | Chida et al. ................ 395/154 |
| 5,534,941 A | * | 7/1996 | Sie et al. .................... 348/564 |
| 5,835,498 A | * | 11/1998 | Kim et al. .................. 370/537 |
| 5,835,914 A | * | 11/1998 | Brim .......................... 707/206 |
| 5,912,917 A | * | 6/1999 | Engelbrecht et al. ......... 375/37 |
| 5,920,878 A | * | 7/1999 | Demont ...................... 707/513 |
| 5,956,624 A | * | 9/1999 | Hunsinger et al. ........... 455/65 |
| 5,982,445 A | * | 11/1999 | Eyer et al. .................. 348/461 |
| 5,987,029 A | * | 11/1999 | Kotani et al. ............... 370/389 |
| 6,246,490 B1 | * | 6/2001 | Sebestyen ................... 358/425 |
| 6,345,145 B1 | * | 2/2002 | Sako et al. ................... 386/94 |

* cited by examiner

*Primary Examiner*—Man U. Phan
*Assistant Examiner*—Toan Nguyen
(74) *Attorney, Agent, or Firm*—Morgan & Finnegan, LLP

(57) ABSTRACT

An information processing apparatus/method employs error detection or correction to encode information to be distributed in a description format used in a multimedia network in which the error detection or correction encodes at least a portion in the header in the information to be distributed with higher redundancy than the entity in the information to be distributed. The encoded information to be distributed in a broadcast signal is multiplexed and transmitted. Alternatively, the information processing apparatus/method may involve: transmitting a portion of the header in the information to be distributed at least a plurality of number of times while the entity in the information to be distributed is transmitted; and/or transmitting a plurality of kinds of information as an entity in the information to be distributed, and using different error detection or correction ability in correspondence with the kind of information. The information processing apparatus/method may also involve inputting information data, and a check code for correcting an error of the information data, detecting the error state of the information data, setting an allowable error state of the information data, and controlling processing for the input information data in accordance with results in the setting step and the detection step.

22 Claims, 16 Drawing Sheets

INFORMATION PROCESSING APPARATUS FOR AND METHOD OF TRANSMITTING AND/OR RECEIVING BROADCAST SIGNAL

BACKGROUND OF THE INVENTION

1. Field of the Invention

The present invention relates to an information processing apparatus and method and, more particularly, to an information processing apparatus for and method of processing information with a description format used in a multimedia network.

2. Related Background Art

In recent years, as a method of using FM radio broadcast, a so-called "visible radio receiver (a radio receiver that can display received character information) which receives character information together with an FM audio signal using a broadcast wave is commercially available. A device of this type has high portability and a very simple circuit, and can receive various kinds of information as long as it can receive an FM wave.

Recently, the information transmitted using FM audio broadcast include news, weather forecasts, and the like. Although such information can be received via a so-called multimedia network, they can be more easily obtained by the "visible radio receiver". The "visible radio receiver" has higher portability than normal multimedia terminals.

However, such receiver can only receive simple character information such as weather forecast information and the like as currently available services, but can neither receive nor store information in a description format used in a multimedia network, which format can be easily handled by a personal computer (PC), in addition to the character information.

Normal data or data that can be processed by a PC may be transmitted in place of the character information. However, when such data is merely broadcasted in place of the character information, its reliability cannot be maintained, and this results in unwanted confusion upon processing of such data.

Such data may be transmitted in a system quite different from the current broadcast. However, the existing system itself must then be reexamined, and this is impractical. Also, the broadcasting station requires considerably large-scale equipment.

Furthermore, when the above-mentioned portable receiver receives such data in addition to the character information, not only the data cannot be effectively used, but also power savings and compactness required for a portable equipment for processing such two different kinds of information may be disturbed.

When digital data is transmitted using a broadcast wave, the transmission efficiency largely depends on the weather conditions and the like, and the data may often suffer so many error data. In such case, a certain user may not need to acquire such data (he or she places an importance on data accuracy), but another user may want to acquire the data even if the data contain many error data (he or she places an importance on data acquisition).

SUMMARY OF THE INVENTION

The present invention has been made in consideration of the above situation, and has as its object to provide a novel information processing apparatus and method, which can multiplex data, which can be easily processed by a versatile processor, on a broadcast signal and can transmit the multiplexed signal with high reliability and without requiring large-scale equipment.

In order to achieve the above object, according to one preferred embodiment of the present invention, there is provided an information processing apparatus/method which error detection or correction encodes information to be distributed in a description format used in a multimedia network, and which error detection or correction encodes at least a portion in a header in the information to be distributed with higher redundancy than an entity in the information to be distributed, multiplexes the encoded information to be distributed in a broadcast signal, and transmits the multiplexed signal.

According to one preferred embodiment of the present invention, there is provided an information processing apparatus/method which inputs information to be distributed in a description format used in a multimedia network, multiplexes the information to be distributed in a broadcast signal, and transmits the multiplexed signal, and which transmits a portion of a header in the information to be distributed at least a plurality of number of times while an entity in the information to be distributed is transmitted.

According to one preferred embodiment of the present invention, there is provided an information processing apparatus/method which error detection or correction encodes information to be distributed in a description format used in a multimedia network, multiplexes the encoded information to be distributed in a broadcast signal, and transmits the multiplexed signal, and which can transmit a plurality of kinds of information as an entity in the information to be distributed, and uses different error detection or correction ability in correspondence with the kind of information.

According to one preferred embodiment of the present invention, there is provided an information processing apparatus/method which inputs information to be distributed in a description format used in a multimedia network, multiplexes the information to be distributed in a broadcast signal, and transmits the multiplexed signal, and in which the information to be distributed is transmitted as an entity in a data format used for multiplexing another information in a description format, which is not used in the multimedia network, in an FM audio signal, the data format forms an error correction code, and a header of the information to be distributed forms an error correction code different from the error correction code.

It is another object of the present invention to provide a novel information processing apparatus and method which can effectively receive and use information that can be easily processed by a versatile processor in addition to information multiplexed beforehand on a broadcast signal, and never disturb a size reduction and energy reduction.

In order to achieve the above object, according to one preferred embodiment of the present invention, there is provided an information processing apparatus/method which receives a broadcast signal obtained by multiplexing information to be distributed in a description format used in a multimedia network and an error correction or detection check code added for at least partial information of the information to be distributed, as an entity of a data format which is used for multiplexing predetermined information in an FM audio signal and includes an error correction check code, and performs an error correction or detection processing of the information to be distributed using the error correction check code and the error correction or detection check code, and which executes the processing based on the error correction check code and processing based on the error correction or detection check code at different timings.

According to one preferred embodiment of the present invention, there is provided an information processing apparatus/method which receives a broadcast signal obtained by multiplexing information to be distributed in a description format, used in a multimedia network, as an entity of a data format used for multiplexing predetermined information in an FM audio signal, and stores the information to be distributed in storage means, and which informs that the received information to be distributed is stored in the storage means and is not output to an external device.

According to one preferred embodiment of the present invention, there is provided an information processing apparatus/method which receives a broadcast signal obtained by multiplexing information to be distributed in a description format, used in a multimedia network, as an entity of a data format used for multiplexing first character information in an FM audio signal, and displays second character information using display means for displaying the first character information when the information to be distributed has the second character information.

According to one preferred embodiment of the present invention, there is provided an information processing apparatus/method which receives a broadcast signal obtained by multiplexing information to be distributed in a description format, used in a multimedia network, as an entity of a data format used for multiplexing character information in an FM audio signal, and stores the information to be distributed in storage means, and which executes a command for displaying information stored in the storage means, and a command for outputting the stored information to an external device at different timings.

It is still another object of the present invention to provide an information processing apparatus and method which can process received data as the user desired even when information transmission, the transmission efficiency of which depends on the weather conditions and the like, is made.

In order to achieve the above object, according to one preferred embodiment of the present invention, there is provided an information processing apparatus/method which inputs information data, and a check code for correcting an error of the information data, detects an error state of the information data, sets an allowable error state of the information data, and controls processing for the input information data in accordance with results in the setting step and the detection step.

Other objects, features and advantages of the invention will become apparent from the following detailed description taken in conjunction with the accompanying drawings.

DETAILED DESCRIPTION OF THE PREFERRED EMBODIMENTS

Figure 1:
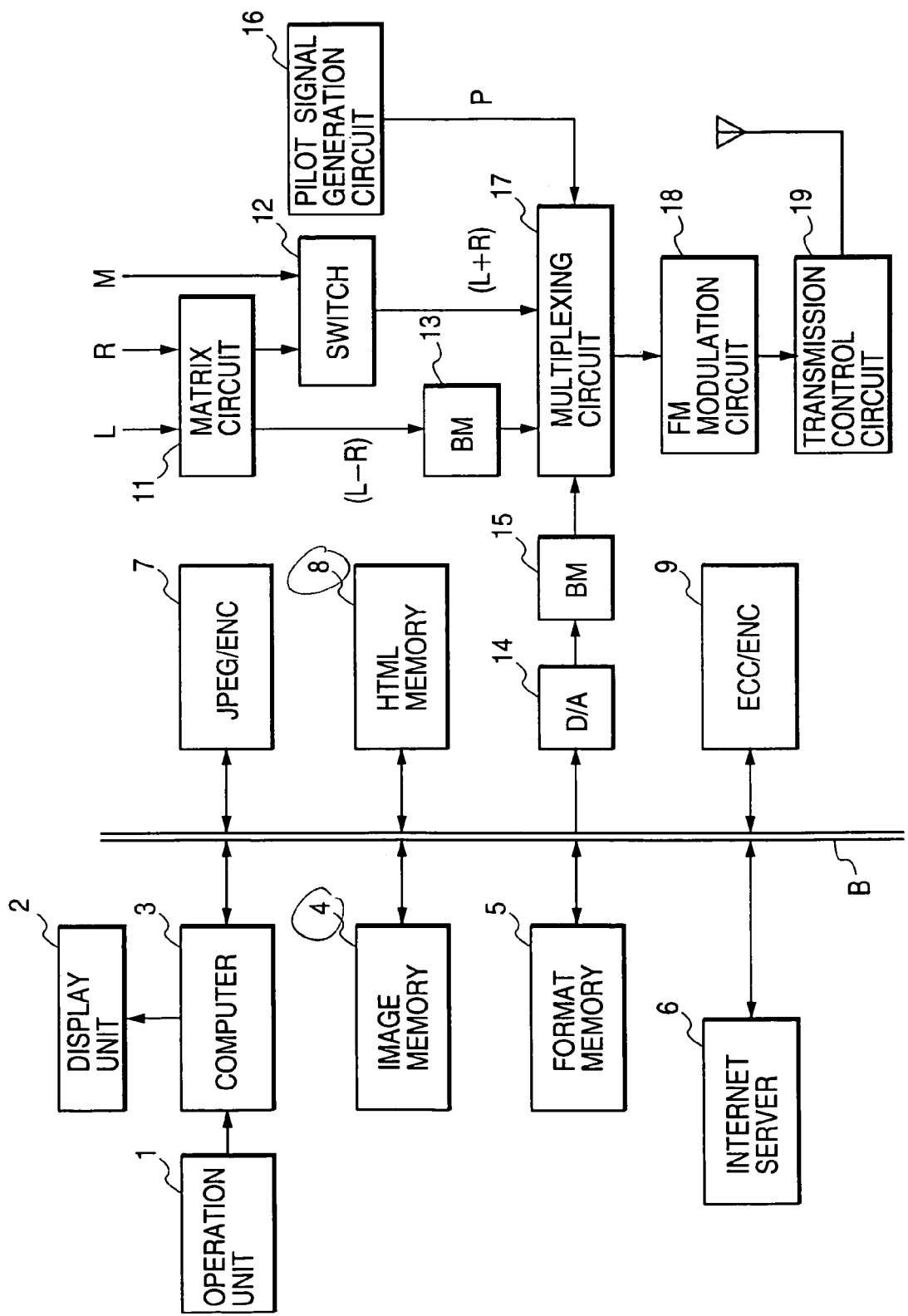
FIG. 1 is a schematic block diagram showing the arrangement of a broadcast signal transmitter according to the present invention.

FIG. 1 is a schematic block diagram showing the arrangement of a broadcast signal transmitter according to the present invention, and shows the transmitter which is equipped in a radio broadcasting station.

Referring to FIG. 1, a personal computer (PC) 3 has an operation unit 1 and display unit 2. This PC is connected to a bus B, and can receive data from this bus B. Also, an image memory 4, format memory 5, Internet server 6, JPEG encoder 7, HTML (HyperText Markup Language) memory 8, error correction code (ECC) encoder 9, and the like are connected to the bus B.

As audio signals which are input from various types of known audio equipment and to be FM-broadcasted, stereophonic audio signals including right (R) and left (L) signals, monaural (M) signal, and the like are assumed. In FIG. 1, a matrix circuit 11 receives R and L signals, and outputs their sum signal (L+R) and difference signal (L−R). The sum signal (L+R) is input to one input terminal of a switch 12. The other input terminal of this switch 12 receives a monaural signal (M), and outputs the monaural signal (M) in case of monaural broadcast or the sum signal (L+R) in case of stereophonic broadcast.

A pilot signal generation circuit 16 generates a pilot signal of a predetermined frequency in response to switching of the switch 12. On the other hand, the frequency of the difference signal (L−R) is converted by a balanced modulation (BM) circuit 13, and is multiplexed on the output from the switch 12 and the pilot signal by a multiplexing circuit 17. The frequency allocations of the individual signals will be explained below with reference to FIG. 2.

Figure 2:
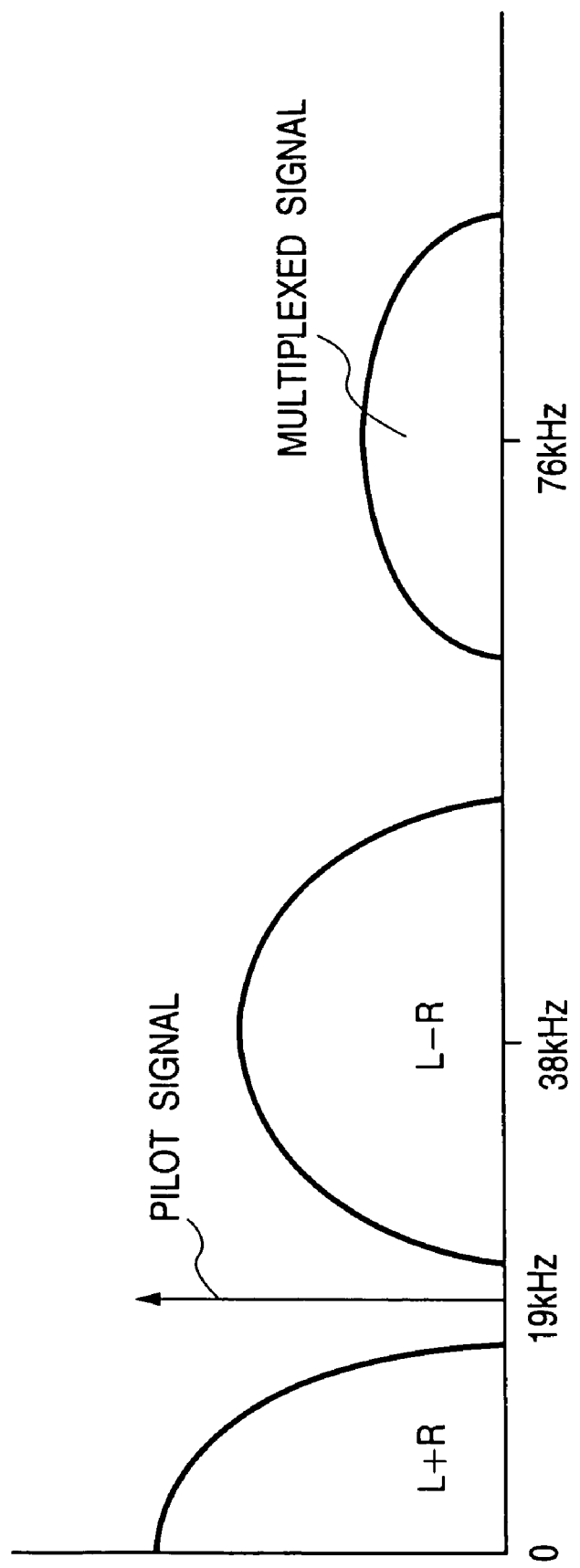
FIG. 2 is a graph showing the frequency spectrum allocation of a signal to be transmitted by the transmitter shown in FIG. 1 before FM modulation.

As shown in FIG. 2, the sum signal (L+R) or monaural signal (M) is allocated at the baseband side, and the difference signal (L−R) is frequency-converted by a carrier wave of 38 kHz using the BM circuit 13 and is allocated in a frequency band shown in FIG. 2. Although not shown, a bandpass filter (BPS) for cutting off unwanted frequency bands is inserted at the output stage of the BM circuit 13.

In this embodiment, digital data is input to a D/A converter 14 via the above-mentioned bus B, and is converted into a binary analog signal. Furthermore, this analog signal is input to a BM circuit 15 and is frequency-converted by a carrier wave of 76 kHz to allocate it at a frequency higher than those of the audio signals and pilot signal. The multiplexing circuit 17 can frequency-multiplex that analog signal and other signals. The multiplexed signal is originally standardized for teletext data, and this embodiment discloses an example of a technique for transmitting data in the HTML format used in a WWW (World Wide Web) as a broadcast wave, using this multiplexed signal.

Figure 3:
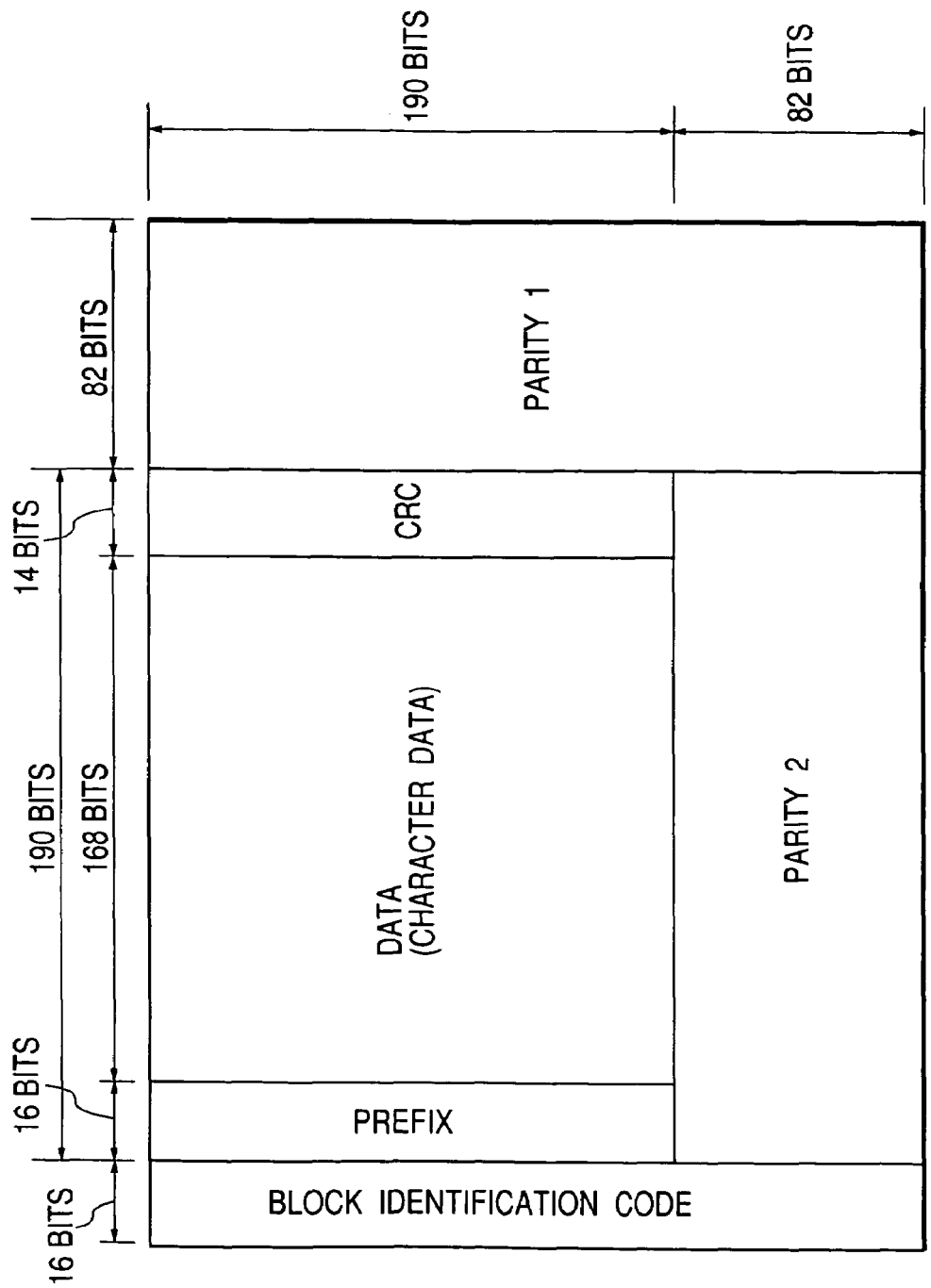
FIG. 3 shows the data format of teletext, which is conventionally used.

The data format of teletext using a conventional FM radio broadcast wave will be explained below with reference to FIG. 3. As shown in FIG. 3, in data in a matrix format, a 16-bit prefix field, 160-bit character data, and a 14-bit CRC code follow a 16-bit block identification code, and an 82-bit parity check code is added for a total of 190 bits of the prefix field, character data, and CRC code, thus forming an error correction code having a code length of 272 bits.

Figure 4:
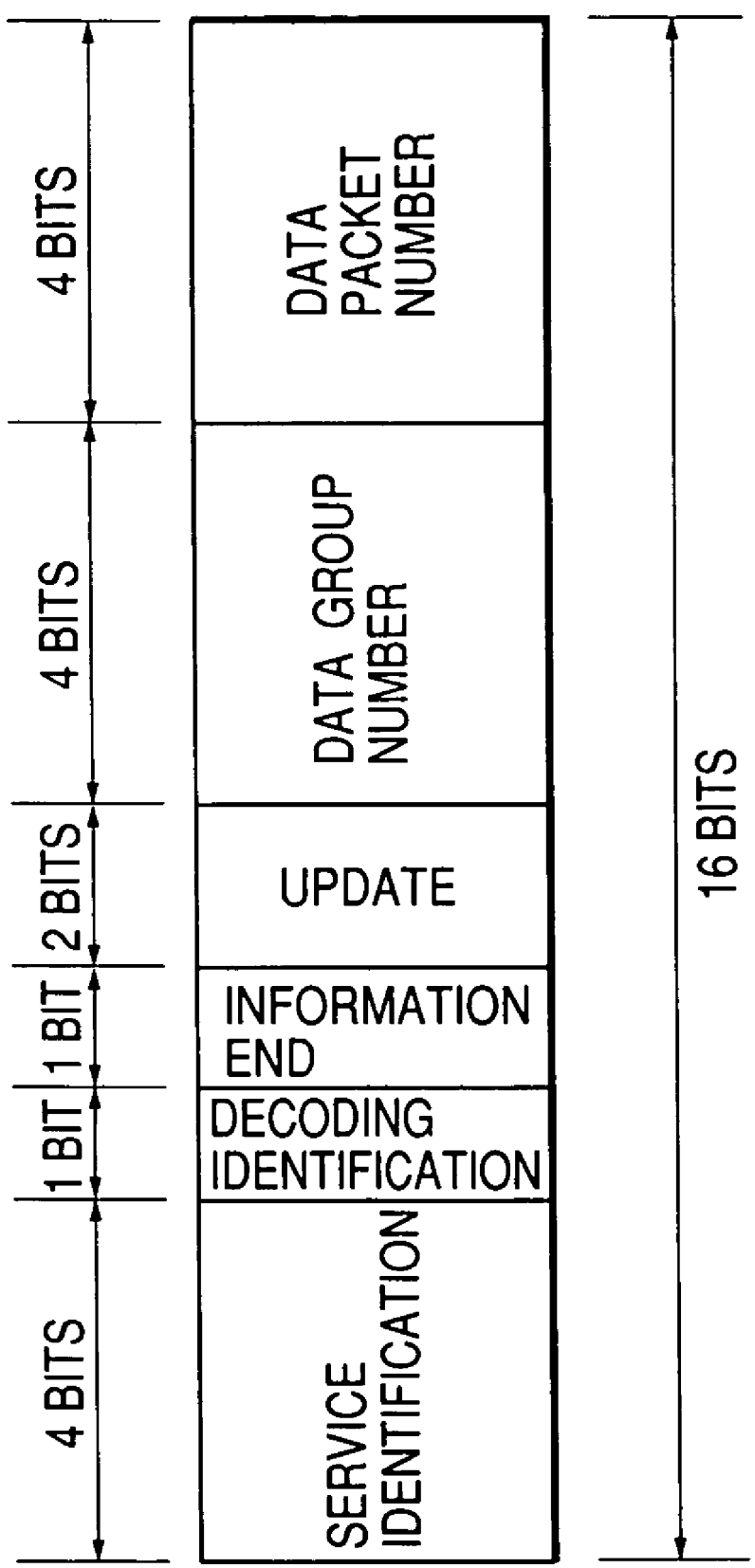
FIG. 4 shows the format of a prefix field shown in FIG. 3 in more detail.

Note that the block identification code is assigned as sync data for identifying the block boundary, and the location of a block is identified by this code to establish block synchronization. The 16-bit prefix field has the format shown in FIG. 4, and contains 4-bit service identification data, 1-bit decoding identification data, 1-bit information end data, 2-bit update data, a 4-bit data group number, and a 4-bit data packet number.

The service identification data indicates the contents of a teletext service, i.e., the type (character, figure information, additional information, auxiliary signal, operation signal) of the program contents and transmission mode. Ten kinds of services have already been defined as the service identification data in the teletext, and the remaining six kinds remain undefined. Hence, in this embodiment, a service for broadcasting data in the HTML format is defined as one of these six kinds. In practice, "0111", "1000", "1001", "1010", and the like are undefined data.

Note that the decoding identification data distinguishes between a case wherein error correction requires decoding in the row direction in FIG. 3 alone, and a case wherein error correction requires decoding of the product code in the row and column directions. The information end data identifies whether or not the block of interest is the last block of each data group, and the update data indicates the number of times of update of the contents of the data group of interest.

In this embodiment, in the prefix field, the service identification bit indicates that the data group of interest is a program of data in the HTML format, and whether or not the data group of interest has been updated for data of the identical previous group using the update data.

Figure 5:
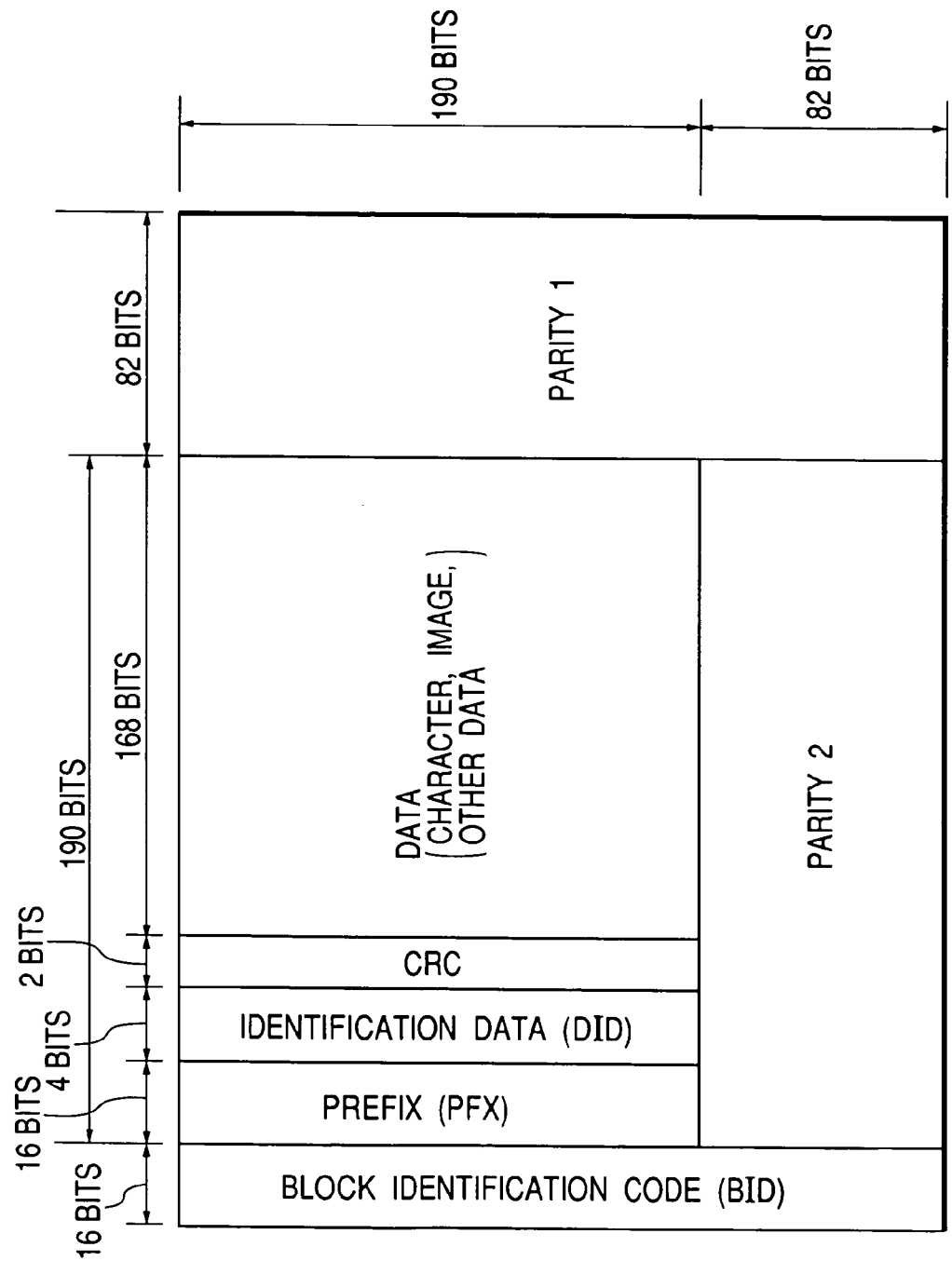
FIG. 5 shows the data format of HTML data transmitted by the transmitter shown in FIG. 1.

FIG. 5 shows the format of data to be transmitted in this embodiment, which format complies with that of the teletext. As shown in FIG. 5, 4-bit identification data (DID) follows immediately after a prefix field. This data DID indicates if data of the block of interest is character data complying with the HTML format, image data, a header, or the like, and also defines its compression method if the character data or image data is compressed data. If this data DID suffers errors during transmission, nonsense data is reconstructed. Hence, in this embodiment, in order to reliably detect if this 4-bit identification code has suffered code errors during transmission, a dedicated CRC code is added after this identification data DID, thus reliably detecting code errors in the identification data.

Figure 6:
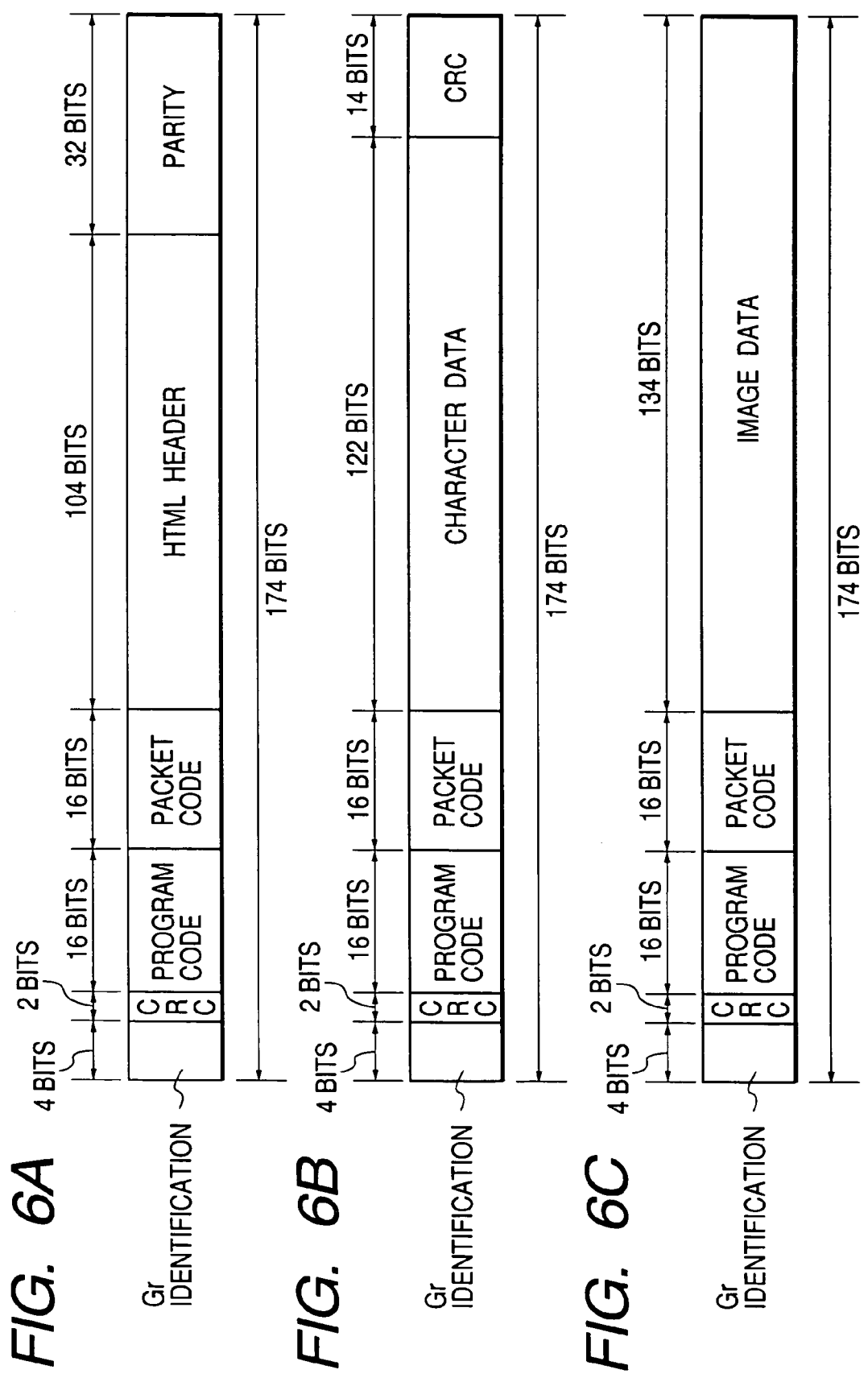
FIGS. 6A, 6B and 6C respectively show the formats of HTML header, character data, and image data to be transmitted according to the format shown in FIG. 5 in more detail.

As shown in FIG. 5, 168-bit actual data can be transmitted in each block. In this embodiment, an HTML header field, character data, and image data have different data formats. FIGS. 6A to 6C show these data formats. As shown in FIG. 6A, in a block used for transmitting the HTML header, 32 bits of the 168-bit data are assigned to parity that forms an error correction code independently of the 82-bit parity shown in FIG. 5. More specifically, the above-mentioned 82-bit parity is added to 190-bit information data to form a 272-bit error correction code, but this 32-bit parity is added to a 16-bit program code, 16-bit packet code, and 104-bit HTML header to form a 168-bit error correction code.

Since all the program code, packet code, HTML header, and parity are integer multiples of 8 bits, a known Reed-Solomon code that can be processed in units of 8 bits can be used as the 168-bit error correction code using the 32-bit parity. In this way, using the error correction code that allows processing in units of 8 bits, a short processing time, circuit scale reduction, and the like can be realized.

The program code is data which is the same as the data group number in the teletext, and defines the program number (of one of $2^{16}$ programs) of HTML data to be broadcasted. The packet code indicates the serial number in each program of each data block (packet), and can add one of 216 numbers so that packet numbers can be assigned to a considerably long document or very sophisticated image.

A block (packet) containing actual information data (entity) such as character data, image data, and the like will be described below. As is well known, even when image data suffers code errors on the transmission path, a sufficiently visible image can be reclaimed as long as data of pixels that neighbor those corresponding to error data can be recovered. In consideration of this advantage of image data and its originally large data volume, image data can be transmitted using all the 134 bits, as shown in FIG. 6C.

On the other hand, as for character data, in order to avoid characters themselves from becoming nonsense upon error correction by the above-mentioned 82-bit parity, a 14-bit CRC code which is the same as that used in known teletext is added. In this fashion, using the same CRC format as in known teletext, existing resources can be effectively used, and normal teletext data and HTML data according to this embodiment can be transmitted using a common circuit.

The data volume to be actually transmitted will be explained below. As the headers of HTML data, a request method, general message header (general header), request header, response header, entity header, and the like are known. As may be apparent from the above description, a broadcast application like in this embodiment requires at least a general header, response header, and entity header.

In this embodiment, header data to be sent include Date (generation date and time of a message) as a general header, Server (server software name) and WWW-Authenticate (authentication method used when the server uses an authentication mechanism) as a response header, Content-length (entity body size), Content-Encoding (schemes of compressing, encrypting, and packaging an object), Content-Transfer-Encoding (encode scheme used upon actual data transfer), and the like as the entity headers. The data volume to be sent amounts to 100 characters as 8-bit alphabet data, i.e., about 800 bits. The data volume of this header field varies depending on programs. As shown in FIG. 6A, since 104-bit data can be transmitted per block, the data volume of the headers roughly amounts to less than 10 blocks.

On the other hand, the data volume of character data also varies depending on the length of one program. For example, assuming that a device has a display LCD screen size of approximately 480×240 dots, each of which is 0.24 mm, and displays 12-point (5 mm×5 mm) font data, character data for nearly 23×11 characters are to be sent per frame. In this case, the required data volume is 4,048 bits (=16×23×11) if Japanese text is expressed by JIS codes, and 33 to 34 blocks are required according to the format shown in FIG. 6B. A standard A4 document requires 19,200 bits (=16×40×30), approximately 160 blocks. Since the data matrix that forms a single product code shown in FIG. 5 can transmit data of 190 blocks, the above-mentioned HTML header data and character data for nearly an A4 size occupies roughly one matrix.

Image data will be explained below. As for image data, when a signal corresponding to one field of a normal television signal such as an NTSC signal is to be transmitted, the number of pixels is, e.g., 76,800 pixels (=240×320). In this case, assuming that all the pixels are quantized by 8 bits per pixel for a luminance signal Y, and pixels are sub-sampled to 1/4 and are then quantized by 8 bits per pixel for two different chrominance signals Cb and Cr, the total number of bits before compression coding is (76,800+76,800/4+76,800/4)×8, i.e., 384 kbits. In this embodiment, this data is compressed to about 50 kbits by JPEG, as will be described later. As shown in FIG. 6C, since the volume of image data that can be transmitted per block is 174 bits, image data for one field can be transmitted using about 290 blocks.

Figure 7:
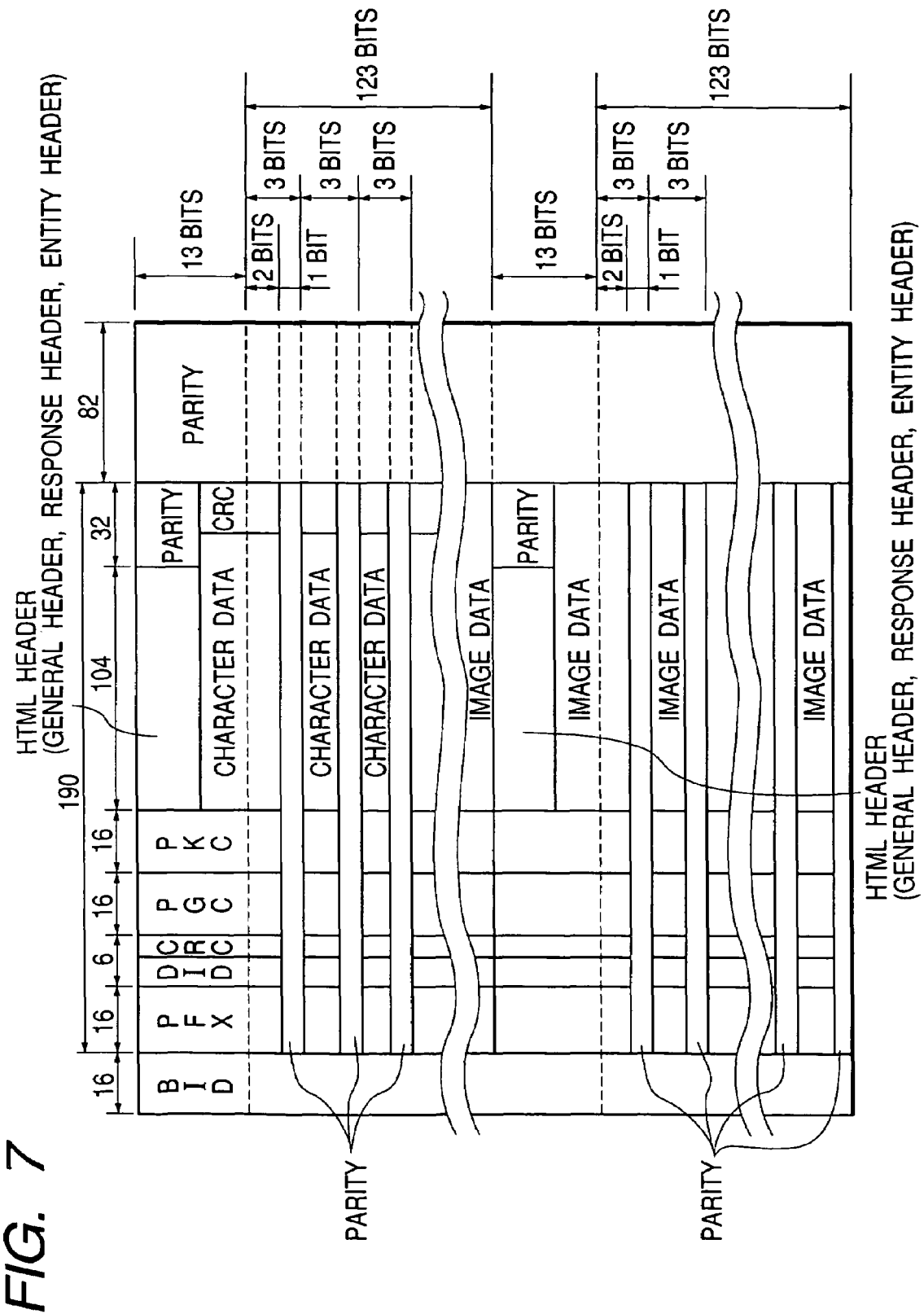
FIG. 7 shows the data format according to the transmission order to be transmitted by the transmitter shown in FIG. 1.

FIG. 7 shows a data matrix obtained by rewriting that shown in FIG. 5 in accordance with the order of data to be actually transmitted by the transmitter of this embodiment. The operation of the transmitter of this embodiment will be explained below with reference to FIG. 7, and the flow chart in FIG. 8 that shows the operation of the computer 3.

Figure 8:
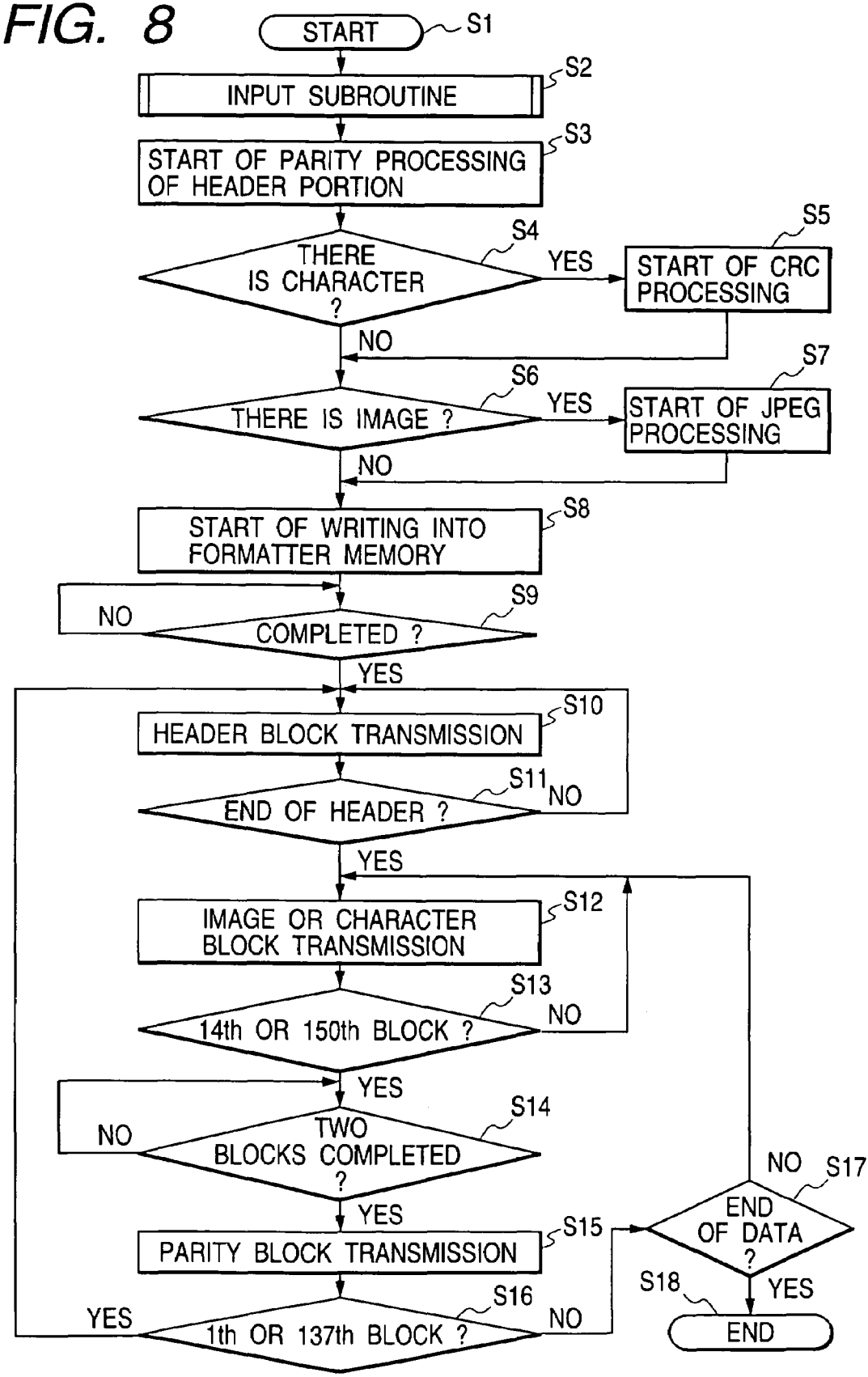
FIG. 8 is a flow chart showing the operation of the transmitter shown in FIG. 1.

When the user commands the computer 3 to multiplex HTML data on a broadcast signal by operating the operation unit 1, the computer 3 displays a guidance on the display unit 2 to direct the user to input at the operation unit 1, and starts the processing according to FIG. 8 (step S1). The user inputs characters at the operation unit 1 or calls a desired HTML file from the Internet server 6 and stores it in the HTML memory 8 via the bus B while observing the guidance on the display unit 2. When the user wants to input image data, he or she calls desired screen data from the Internet server 6 as bitmap data, and stores it in the image memory 4 via the bus B. Since this series of operations are not directly associated with the present invention, they are summarized as an input subroutine (step S2) in the flow chart in FIG. 8.

Upon completion of storage of data in the image memory 4 and HTML memory 8, HTML header data stored in the HTML memory 8 is transferred to the ECC encoder 9 in accordance with an instruction from the computer 3 to start formation of 32-bit parity for a 104-bit header shown in FIG. 6C (step S3). The ECC encoder 9 incorporates a 16-bit RISC processor and the like, and can form an error correction code without any processing by the computer 3. Hence, while the computer 3 is executing the processing in step S4 and the subsequent steps in the flow chart in FIG. 8, the ECC encoder 9 parallelly calculates parity.

If character data is stored (step S4), processing for adding a 14-bit CRC code to 122-bit character data in FIG. 6B is done in the computer 3 (step S5). On the other hand, if image data is stored (step S6), the processing for adding the CRC code is interrupted, and image data stored in the image memory 4 is supplied to the JPEG encoder 7 and is compressed by JPEG (step S7). Note that this JPEG encoder 7 comprises a hardware chip, and can process parallel to the CRC formation in step S5.

When JPEG compression starts, the JPEG-compressed data, HTML header data with parity, character data added with a CRC code, and the like begin to be written in the format memory 5 (step S8). In the format memory 5, the individual data are written at locations according to the transmission format shown in FIG. 7.

As shown in FIG. 7, transmission starts from blocks that store the header. Of the 272 blocks in the transmission data matrix shown in FIG. 7, the first 13 blocks and the 137th to 149th blocks sent include only data blocks without any parity blocks. Blocks including the header data are successively transmitted from the first and 137th blocks, and when the data volume including the header exceeds 136 blocks, the header blocks are transmitted repetitively. In this way, in this embodiment, since the HTML header is transmitted as early as possible, and is sent respectively for a file with a large volume, the receiver side can obtain HTML header data with higher reliability earlier.

If it is detected in step S9 in FIG. 8 that all the data have been written in the format memory 5, the ECC encoder 9 calculates an 82-bit parity for 190-bit data including an HTML data header and 32-bit parity stored in the format memory 5 and a 288-bit data block obtained by adding a block identification code to these 272 bits is output in step S10. Note that the 190-bit data includes a group identification code (DID), 2-bit CRC, 16-bit program code (PGC), packet code (PKC), the above-mentioned prefix (PFX), and the like, as shown in FIG. 6A.

Upon completion of transmission of one header block, the internal counter (not shown) of the computer 3 is counted up to count the number of transmitted blocks. Upon completion of the header data (step S11), image or character data blocks are transmitted (step S12). In FIG. 7, character data blocks are sent first, which are followed by image data blocks. However, this transmission order depends on the configuration of the HTML file to be actually transmitted.

To restate, only data blocks are continuously transmitted until the 13th block, and no parity block is transmitted. However, after the 14th block, one parity block is transmitted every third block. More specifically, when it is detected based on the above-mentioned count value in step S13 that the next block to be transmitted is the 14th or 150th block, another internal counter in the computer 3 is incremented. If another two data blocks (image or character data) have been transmitted (step S14) based on the count value, a parity block is transmitted (step S15). As for such parity blocks, the ECC encoder 9 starts calculations upon completion of data write in the format memory in step S9, and the calculated parity data are sequentially written in the format memory 5.

After the parity block is transmitted, it is checked if the next block to be transmitted is the first or 137th block in the data matrix shown in FIG. 7 (step S16). If NO in step S16, it is checked if the data to be transmitted has come to an end (step S17). If NO in step S17, transmission of two blocks and one parity blocks repeats itself in steps S12 to S15.

If the next block to be transmitted is the first or 137th block, the flow returns to step S10 to successively transmit header blocks again. This operation repeats itself until it is detected in step S17 that the data to be transmitted has come to an end. When there is no more data to send, the processing ends (step S18). In such way, the transmission data which are sequentially output from the bus B to the D/A converter 14 according to the data format shown in FIG. 7 are multiplexed with an FM audio signal by the multiplexing circuit 17, as described above, and the multiplexed signal is FM-modulated by a broadcast carrier using an FM modulation circuit 18. The modulated signal is then transmitted as a broadcast wave via a transmission control circuit 19.

As described above, the transmitter of this embodiment can transmit HTML data while maintaining compatibility with the character data transmission function of a conventional FM radio broadcast. Also, in this embodiment, an error correction code is added by setting the redundancy of the HTML header higher than other data, and the error correction code used in conventional teletext is also used. Hence, the header of HTML data can have reliability equivalent to that obtained when the HTML data is transmitted via another network. Furthermore, burst errors unique to a broadcast wave can be coped with by transmitting the header a plurality of number of times, and high reliability can be assured as a whole.

Since different error detection or correction redundancies are used for the image and character data, the required data can be transmitted with minimum redundancy, and high reliability can be guaranteed as a whole.

A receiver of the present invention which receives the above-mentioned broadcast signal will be described in detail below.

Figure 9:
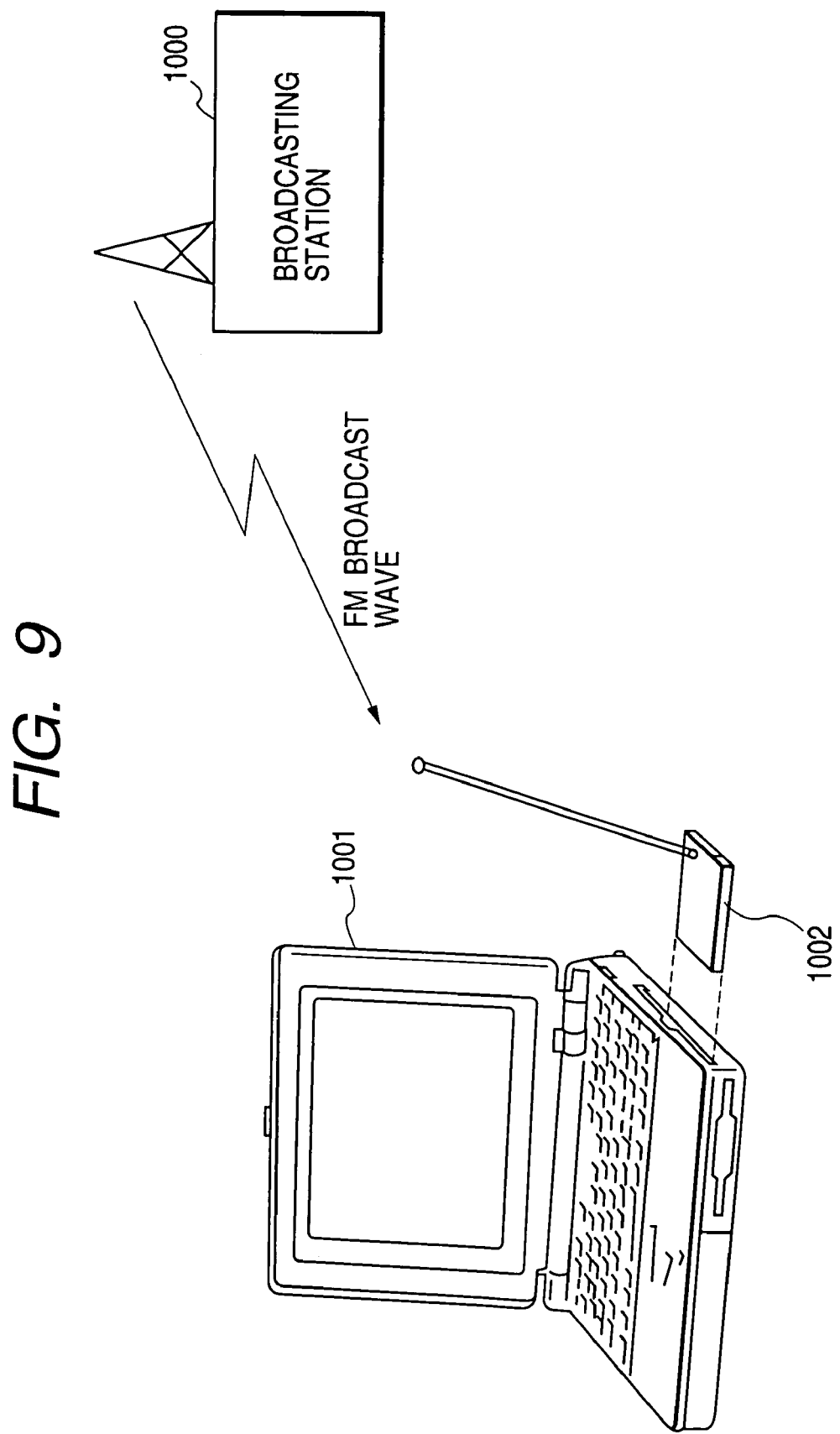
FIG. 9 is a schematic view showing the arrangement of a receiving system that receives the data transmitted by the transmitter shown in FIG. 1.

FIG. 9 shows the schematic arrangement of a reception system that receives data transmitted by the transmitter shown in FIG. 1.

In FIG. 9, the system includes an FM broadcasting station 1000, a portable computer 1001 such as a sub notebook personal computer, or the like, and a portable receiver 1002 having an FM broadcast reception function. The portable receiver 1002 comprises an interface complying with PCMCIA (which is an international standard for memory cards and I/O cards (modem, LAN, and SCSI cards, and the like), and can be connected to a personal computer.

Information data transmitted by means of an FM broadcast wave from the FM broadcasting station 1000 is received by the portable receiver 1002, which decodes and displays the received data. When the portable receiver 1002 is connected to the portable computer 1001, the received information data is decoded by the portable computer 1001 and is displayed on a display unit or is stored in a recording medium.

Figure 10:
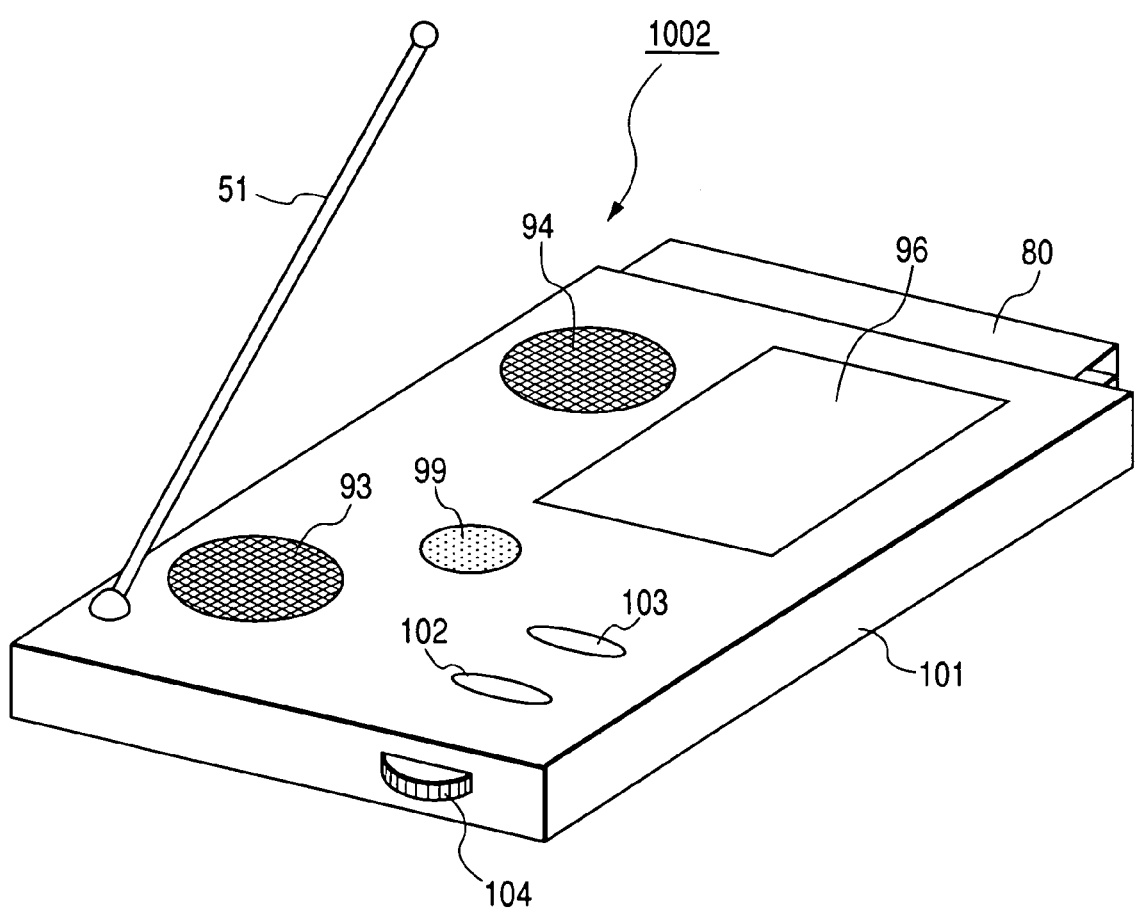
FIG. 10 is a perspective view showing the outer appearance of a receiver 1002.

FIG. 10 is a perspective view showing the outer appearance of the portable receiver 1001.

In FIG. 10, a portable receiver main body 101 has manual operation keys 102, 103, and 104 which are respectively used for issuing a display command and external output command, and selecting a broadcasting station. These keys correspond to an operation unit 98 shown in FIG. 11 (to be described later). The main body 101 also has a retractable antenna 51, a pair of loudspeakers 93 and 94 which can output stereophonic audio signals, a flat panel display 96, an external interface 80 complying with PCMCIA, and an indicator 99 indicating that HTML format data which has not been output to external equipment is stored in the main body after reception.

Figure 11:
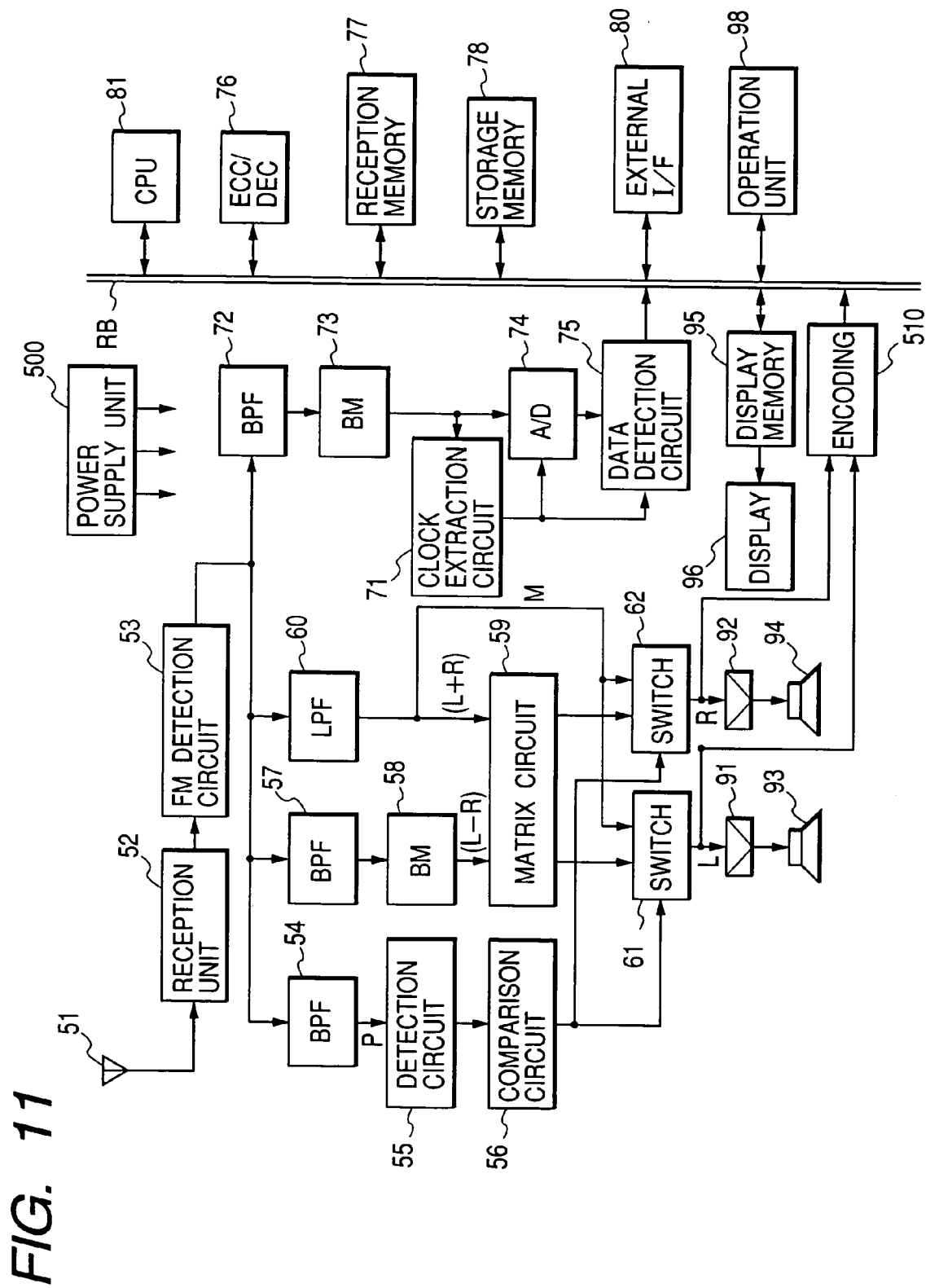
FIG. 11 is a block diagram showing the internal arrangement of the receiver 1002.

FIG. 11 is a block diagram showing the internal arrangement of the portable receiver 1001.

The processing executed when the receiver 1001 outputs an FM broadcast radio audio signal to the loudspeakers 93 and 94 will be explained below. Note that a desired broadcasting station is selected by the operation unit 98.

In FIG. 11, a broadcast wave received at the antenna 51 is tuned by a reception unit 52, and is detected by an FM detection circuit 53 to be converted into a multiplexed signal shown in FIG. 2. A bandpass filter (BPF) 54 separates the above-mentioned pilot signal, and supplies the separated pilot signal to a detection circuit 55. The output from the detection circuit 55 is compared with a predetermined threshold value by a comparison circuit 56, thus determining based on the comparison result if the broadcasted audio signal is a stereophonic or monaural signal.

On the other hand, a low-pass filter (LPF) 60 extracts a baseband signal shown in FIG. 2, and supplies the extracted signal to a matrix circuit 59 as a monaural signal or the sum signal of stereophonic audio signals. A BPF 57 extracts a signal carried by a carrier wave of 38 kHz, and the extracted signal is converted to a baseband signal, i.e., the difference signal of the stereophonic audio signals by a balanced modulation (BM) circuit 58. After that, the difference signal is supplied to the matrix circuit 59. When a stereophonic broadcast wave is received, the matrix circuit 59 outputs right (R) and left (L) signals of the stereophonic audio signals, and these signals are output via switches 61 and 62 controlled by the output from the comparison circuit 56.

On the other hand, when a monaural broadcast wave is received, both the switches 61 and 62 output the audio signal output from the LPF 60, thus similarly outputting monaural audio signals. The audio signals output from the switches 61 and 62 are output from the loudspeakers 93 and 94 via amplifiers 91 and 92, respectively.

The above-mentioned data signal multiplexed on a carrier of 76 kHz is separated by a BPF 72, and is converted by a BM circuit 73 into a signal corresponding to a data sequence in the data format shown in FIG. 7. This signal is supplied to a clock extraction circuit 71 to form free-running clocks, and is converted into digital data by an A/D converter 74 using these clocks. The digital data is supplied to a known data detection circuit 75 to obtain original digital data. Note that the data detection circuit 75 is comprised of a known integral detection circuit, equivalent circuit, a decoding circuit using partial response, and the like.

The operation executed when the receiver of this embodiment receives conventional teletext data according to the data format shown in FIG. 3 will be explained below. As described above, the conventional teletext data is also transmitted using the parity allocations shown in FIG. 7.

Data detected by the data detection circuit 75 are output onto a reception bus RB as a data sequence, and are stored in a reception memory 77 under the control of a CPU 81. An ECC decoding circuit 76 accesses the data in the reception memory 77 under the control of the CPU 81, and performs error correction using the above-mentioned product code parity. Note that this error correction is performed using 82-bit parity in units of data blocks, and subsequently, error correction is performed using 82-bit parities distributed in the vertical direction in FIG. 7.

The error-corrected character information is transferred to a storage memory 78. When the user operates the display command switch 102 (FIG. 10), the character data in the storage memory 78 is written in a display memory 95 while being converted into display codes, and characters are displayed on the display 96.

Figure 12:
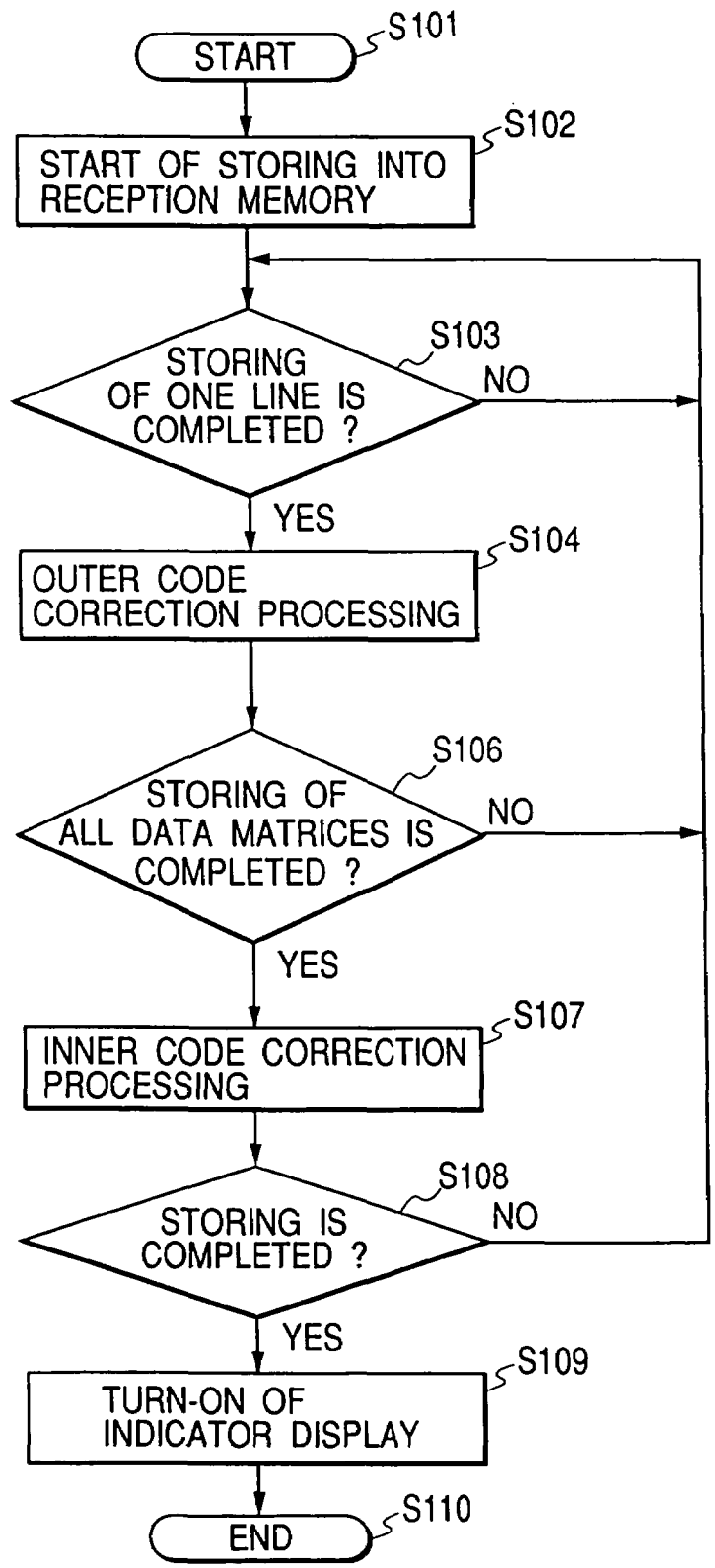
FIG. 12 is a flow chart for explaining the operation of the receiver 1002 upon reception of HTML data.

FIG. 12 is a flow chart for explaining the operation upon reception of the above-mentioned HTML data by the receiver of this embodiment, and that operation will be explained below with reference to this flow chart.

When the reception unit 52 begins to receive data (step S101), data detected by the data detection circuit 75 are output onto the reception bus RB as a data sequence corresponding to the data format shown in FIG. 7, and are stored in the reception memory 77 under the control of the CPU 81 according to the format shown in FIG. 7 (step S102).

When data for one line (one data block) in the data matrix of FIG. 7 are stored in the reception memory 77 (step S103), the ECC decoding circuit 76 begins to access the data in the reception memory 77 under the control of the CPU 81. More specifically, error correction processing is executed using 82-bit outer code parity in units of data blocks (step S104).

Note that steps S103 and S104 repeat themselves until the entire data matrix shown in FIG. 7 is stored in the reception memory. After the entire data matrix in FIG. 7 has been stored (step S106), the ECC decoding circuit 76 begins to access the data in the reception memory 77 again. At this timing, error correction processing is made using 82-bit inner code parities distributed in the data matrix in FIG. 7 in the vertical direction (step S107).

Upon completion of the processing for one data matrix using the outer and inner code parities, the data are transferred from the reception memory 77 to the storage memory 78, and it is checked if all the data to be received have been received (step S108). If YES in step S108, the above-mentioned indicator 99 is turned on, i.e., lighted (step S109), thus ending the processing (step S110).

Figure 13:
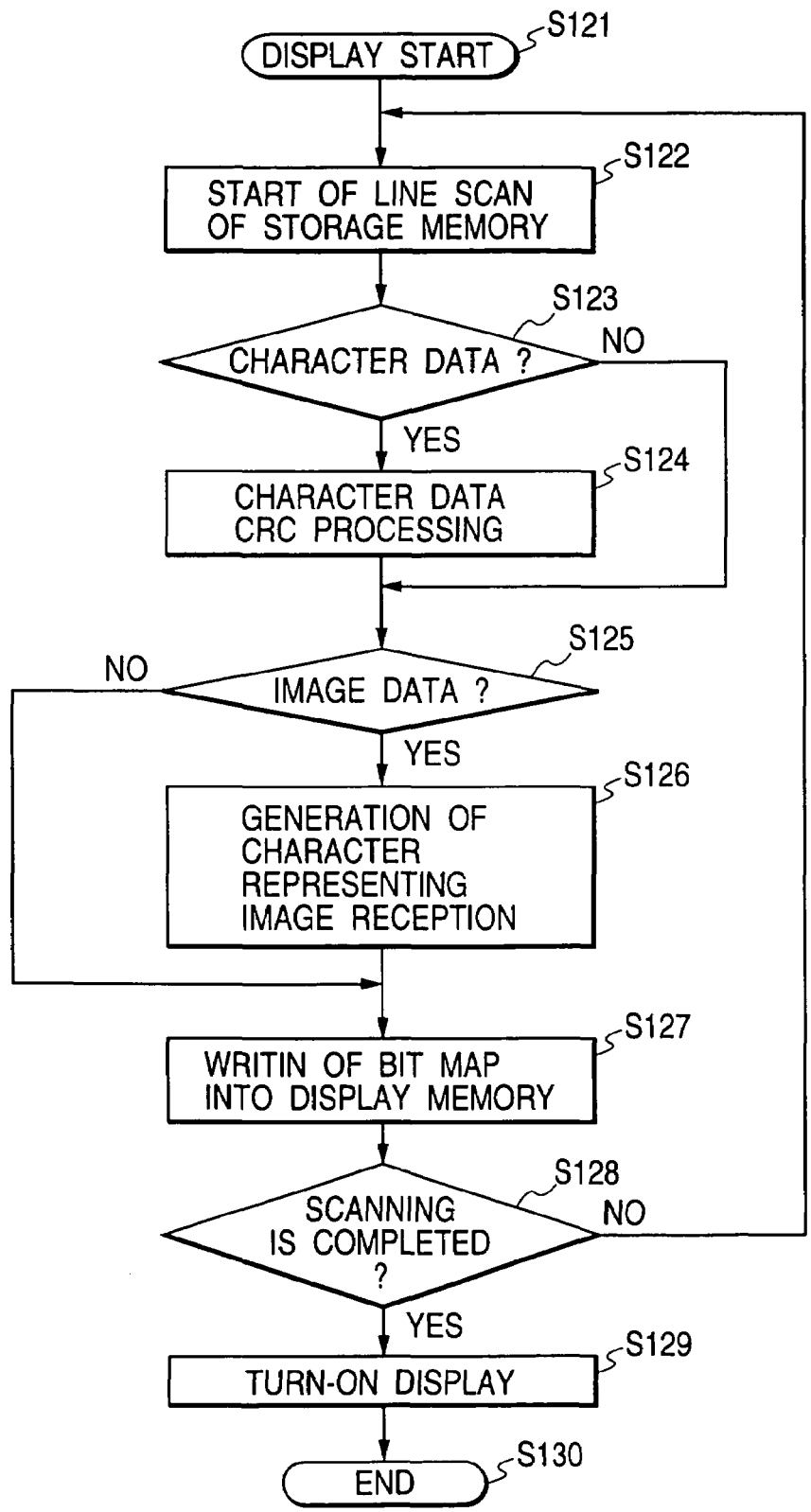
FIG. 13 is a flow chart for explaining operation upon operation of a display command switch on the receiver 1002.

FIG. 13 is a flow chart for explaining the operation executed upon depression of the above-mentioned display command switch 102 when the aforementioned HTML data are stored in the receiver of this embodiment, and that operation will be explained below with reference to this flow chart.

If the display command switch 102 is turned on (step S121), the data stored in the storage memory 78 begin to be scanned under the control of the CPU 81 (step S122). This scan is done in units of lines, and the stored data for each line are processed under the control of the CPU 81. The CPU 81 monitors if the data of each line that have been subjected to error correction processing using a product code are character data, image data, or header data. If the line data to be processed are character data (step S123), the CPU 81 supplies the line data to the ECC decoding circuit 76 to detect the presence/absence of errors using a 14-bit CRC code shown in FIG. 6B (step S124). If no errors are detected, the character data are mapped into bitmap data, which are written in the display memory 95 (step S127).

On the other hand, if the line data to be processed are image data (step S125), since the portable receiver of this embodiment cannot display any image, characters representing image data reception are generated (step S126), and bitmap data of these characters are written in the display memory 95 in step S127.

Upon completion of scanning of all the lines (step S128), the bitmap data stored in the display memory 95 are displayed as characters on the display 96 (step S129), thus ending the processing (step S130). If the line data to be processed are HTML header data, since this portable receiver cannot use them, these data are neither subjected to error correction processing nor written in the display memory 95.

Figure 14:
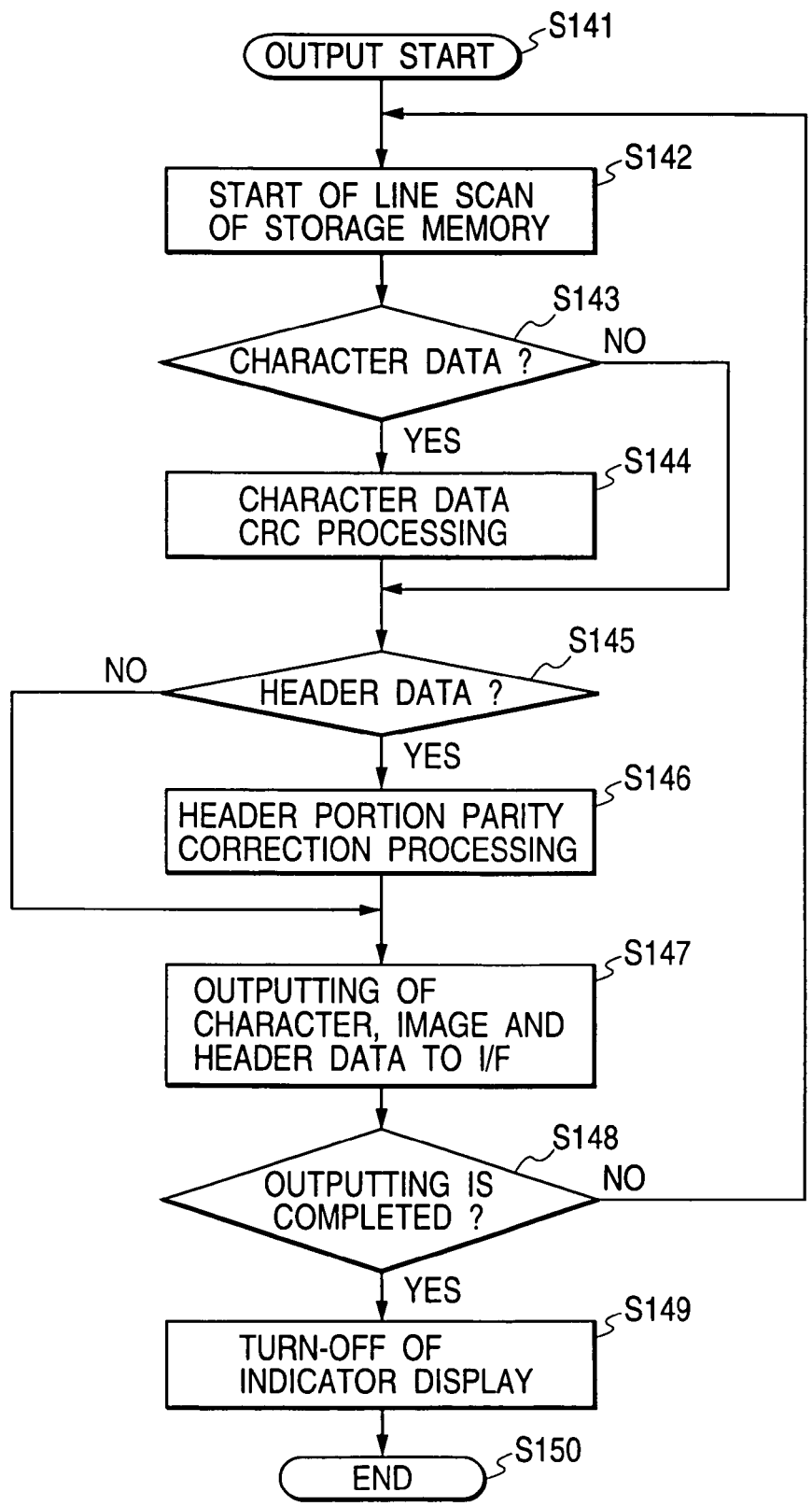
FIG. 14 is a flow chart for explaining operation upon operation of an external output command switch on the receiver 1002.

FIG. 14 is a flow chart for explaining the operation executed upon depression of the external output command switch 103 when the aforementioned HTML data are stored in the receiver of this embodiment, and that operation will be explained below with reference to this flow chart.

If the external output command switch 103 is turned on (step S141), the data stored in the storage memory 78 begin to be scanned under the control of the CPU 81 (step S142). This scan is done in units of lines, and the stored data for each line are processed under the control of the CPU 81. The CPU 81 monitors if the data of each line that have been subjected to error correction processing using a product code are character data, image data, or header data.

If the line data to be processed are character data (step S143), the presence/absence of errors is detected using the 14-bit CRC code shown in FIG. 6B as in case of the display command (step S144). If no errors are detected, the character data are directly output to external equipment such as a PC in units of lines of the data matrix shown in FIG. 7 via an external I/F 80 which complies with PCMCIA (step S147).

On the other hand, if the line data to be processed are image data, the image data are output to the PC or the like via the I/F 80 without any processing. Furthermore, if the line data to be processed are HTML header data (step S145), error correction processing is performed using 32-bit parity shown in FIG. 6A, and data which have been subjected to error correction twice are output to the external equipment in units of lines via the I/F 80.

Upon completion of scanning of all the lines (step S148), the data matrix stored in the storage memory is deleted or overwrite on this matrix is permitted, and the indicator 99 is turned off (step S149), thus ending the processing (step S150).

As described above, upon receiving data, upon displaying received data, or upon outputting the received data to external equipment, the portable receiver of this embodiment performs only error detection or correction required for each operation, and does not perform any unnecessary processing, thus preventing the receiver from performing unwanted operations.

When data which cannot be handled by or cannot be effectively processed by the receiver of this embodiment are received, the received data are stored, and the indicator which indicates that the received data have not been output is turned on. Hence, the operator can easily recognize such state, and the received data can be prevented from being wasted.

In the receiver of this embodiment, the display device and display command switch, which are used for displaying the conventional teletext character data can be directly used for displaying characters received as data in the HTML format. Hence, the above-mentioned composite functions can be implemented without increasing the receiver size.

The image data supplied to the PC are reconstructed into original image data by a JPEG decoder installed in the PC, and are processed according to links recognized based on the header.

When the receiver 1002 is attached to the computer 1001, it is controlled by the computer 1001. Furthermore, the receiver 1002 comprises a power supply unit 500 including an internal battery, and can be sufficiently driven by itself. However, when the receiver 1002 is attached to the computer 1001, it is driven by receiving a power supply from the computer, and the internal battery of the power supply unit 500 is charged.

The arrangement of the computer 1001 will be explained below.

Figure 15:
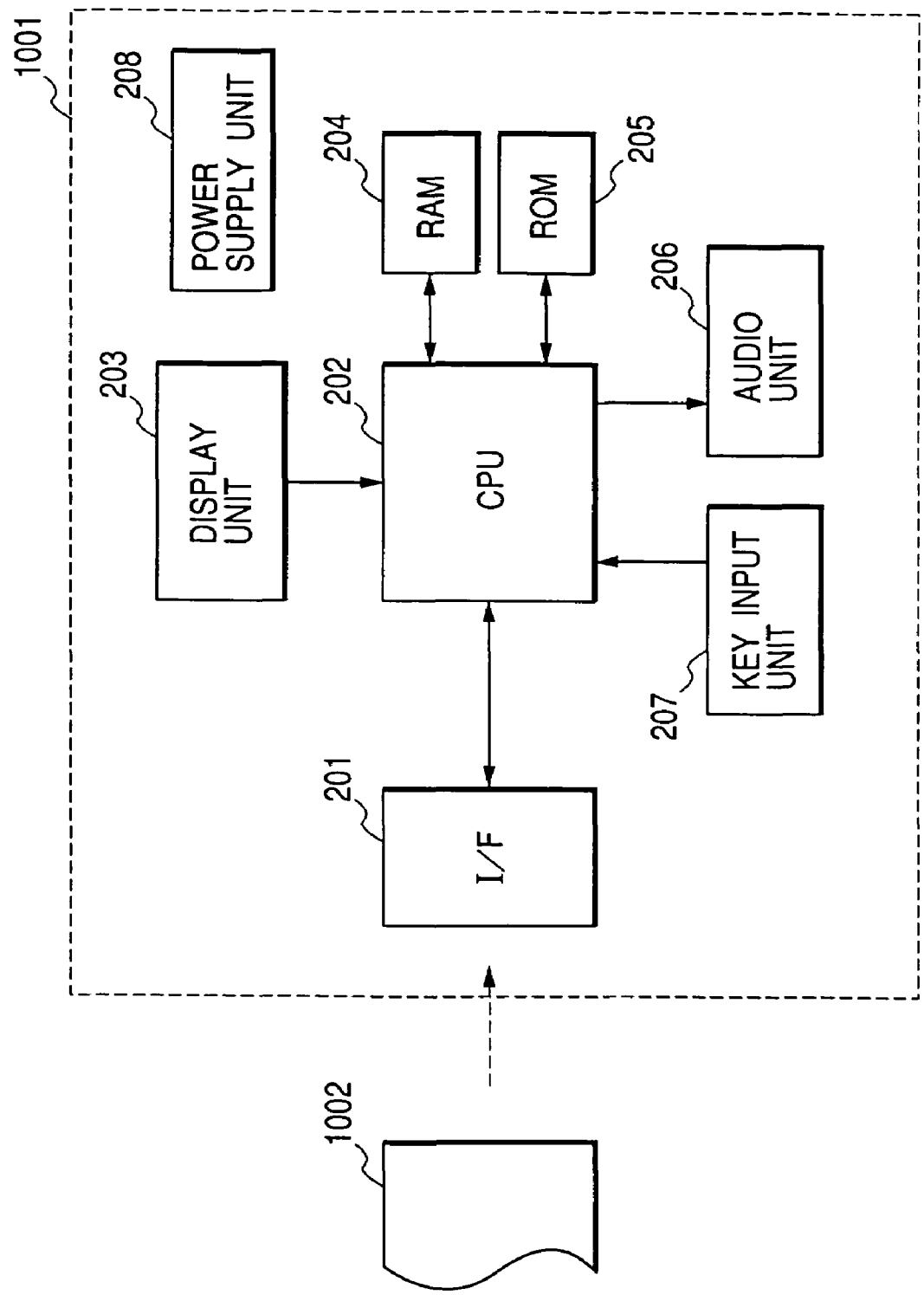
FIG. 15 is a block diagram showing the internal arrangement of a computer 1001.

FIG. 15 is a block diagram showing the internal arrangement of the computer 1001.

The portable computer 1001 is comprised of an I/F 201 having a connector which allows connection to the receiver 1002, a CPU 202 for controlling the overall portable computer 1001, and also the receiver 1002, a display unit 203, a RAM 204 for storing received data which are received via the I/F 201, a ROM 205 which stores an application software program and the like for fetching and processing information data based on an FM broadcast wave in the computer, an audio unit 206 for outputting an audio signal, and a key input unit 207 for inputting various instructions.

Reception of information data based on an FM broadcast wave received from the receiver 1002 by the computer 1001 will be explained below with reference to FIG. 16.

Figure 16:
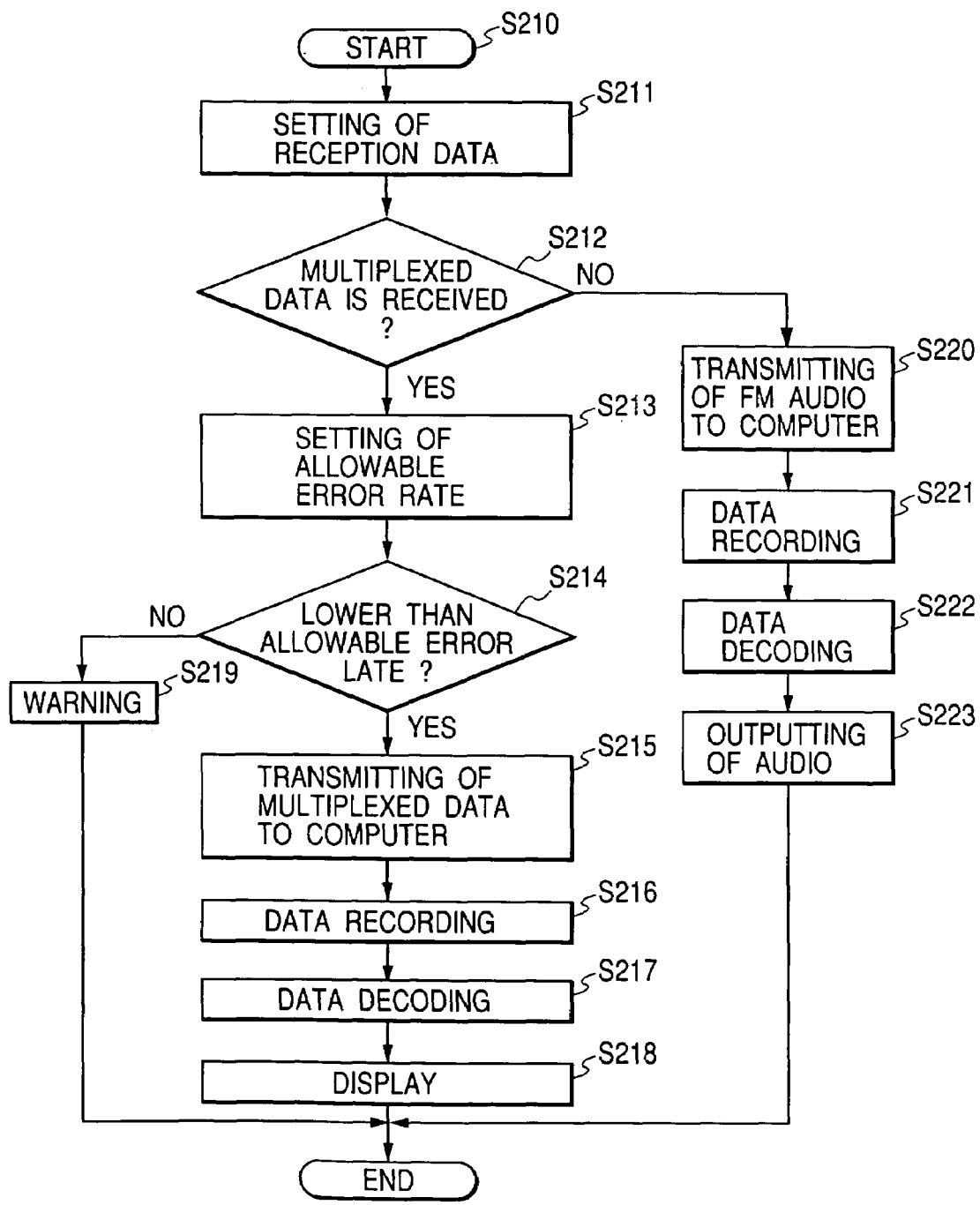
FIG. 16 is a flow chart for explaining reception executed when the computer 1001 receives data from the receiver 1002.

FIG. 16 is a flow chart showing reception executed when the portable computer 1001 receives data from the receiver 1002.

An application program for receiving information sent by means of an FM broadcast wave is read out from the ROM 205, and is started, thus driving the receiver 1002 (step S210).

Subsequently, whether FM audio data of the FM broadcast wave or multiplexed data of an FM multiplexed broadcast is to be received is selected using the key input unit (step S211). This data is transmitted to the CPU 81 of the receiver 1002 via the I/F 201.

If it is selected in step S211 that the multiplexed data of the FM multiplexed broadcast is to be received (step S212), the user sets an allowable range within which multiplexed data received by the receiver 1002 is used as information data, using the key input unit 207. In this embodiment, an allowable error rate of multiplexed data is set (step S213). This setting data is also transmitted to the CPU 81 of the receiver 1002 via the I/F 201. Via such setup processing, the user can set by himself or herself if he or she places an importance on data availability or accuracy.

The CPU 81 of the receiver 1002 checks if the received multiplexed data has an error rate equal to or lower than the allowable error rate set at the portable computer 1001 (step S214).

In this case, the number of error data detected by the ECC decoding circuit 76 is counted to calculate the error rate of the received data, and the calculated error rate is compared with the set allowable error rate.

If the calculated error rate is higher than the allowable error rate, transmission of that data is suspended, and a message indicating this is transmitted to the portable computer 1001. The portable computer 1001 displays a warning message on its display unit 203, thus ending the flow (step S224).

If it is determined in step S214 that the calculated error rate is equal to or lower than the allowable error rate, the receiver 1002 transmits the multiplexed data to the portable computer 1001 (step S215), and the multiplexed data transmitted to the portable computer 1001 is recorded in the RAM 204 (step S216).

Upon completion of data recording in the RAM 204, data decoding (for decoding HTML data or teletext character data) is done (step S217), and the decoded multiplexed data is displayed on the display unit 203 (step S218), thus ending the flow (step S224).

If reception of the multiplexed data is not set in step S212, the receiver 1002 encodes received FM audio data by an encoding circuit 510, and transmits the encoded data to the computer 1001 (step S220). The transmitted encoded FM audio data is recorded in the RAM 204 (step S221).

Upon completion of data recording in the RAM 204, the data decoding is done (step S222), and the decoded FM audio data is output from the audio unit 206 (step S223), thus ending the flow (step S224).

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing apparatus comprising:
   a) an encoding unit, arranged to error detection or correction encode first information to be distributed in a Markup language description format used in a multimedia network,
   said encoding unit error detection or correction encoding at least a portion in a header in the information to be distributed with higher redundancy than an entity in the information to be distributed; and
   b) a transmission unit, arranged to multiplex the first information encoded by said encoding unit in a broadcast signal, and transmitting the multiplexed signal, wherein said transmission unit is also arranged so as to multiplex second information including character information into the broadcast signal without using the Markup language description format to transmit the thus-multiplexed signal, wherein the first information has a data format thereof which includes a format that complies with a data format of the second information, and wherein the data format forms an error correction code, the first information is transmitted as an entity in the data format of the second information, and the header of the first information forms another error correction code.

2. The apparatus according to claim 1, wherein the broadcast signal is an FM audio broadcast signal, and said transmission unit frequency-multiplexed the information to be distributed in a frequency band different from an FM-modulated audio signal.

3. The apparatus according to claim 1, wherein the Markup language description format is an HTML (HyperText Markup Language) format.

4. The apparatus according to claim 1, wherein the first information can contain character information and image information as an entity thereof, and when the entity is the character information, the first information has higher redundancy than when the entity is the image information.

5. The apparatus according to claim 1, wherein the header of the first information is transmitted a plurality of number of times while being distributed in the entity.

6. An information processing apparatus comprising:
   a) an input unit, arranged to input first information to be distributed in a Markup language description format used in a multimedia network; and
   b) a transmission unit, arranged to multiplex the first information in a broadcast signal and transmit the multiplexed signal,
   wherein a portion of a header in the first information is transmitted at least a plurality of number of times while an entity in the first information is transmitted,
   wherein said transmission unit is also arranged so as to multiplex second information including character information into the broadcast signal without using the Markup language description format to transmit the thus-multiplexed signal,
   wherein the first information has a data format thereof which includes a format that complies with a data format of the second information, and wherein the data format forms an error correction code, and the header of the first information forms another error correction code.

7. The apparatus according to claim 6, wherein the Markup language description format is an HTML (HyperText Markup Language) format.

8. An information processing apparatus comprising:
   a) an encoding unit, arranged to error detection or correction encode first information to be distributed in a Markup language description format used in a multimedia network; and
   b) a transmission unit, arranged to multiplex the first information encoded by said encoding unit in a broadcast signal, and transmit the multiplexed signal,
   wherein a plurality of kinds of information are able to be transmitted as an entity in the first information, wherein said encoding unit uses different error detection or correction ability in correspondence with the kind of information, wherein said transmission unit is also arranged so as to multiplex second information including character information into the broadcast signal without using the Markup language description format to transmit the thus-multiplexed signal, wherein the first information has a data format thereof which includes a format that complies with a data format of the second information, and wherein the data format forms an error correction code, the first information is transmitted as an entity in the data format of the second information, and the header of the first information forms another error correction code.

9. The apparatus according to claim 8, wherein the Markup language description format is an HTML (HyperText Markup Language) format.

10. An information processing method comprising the steps of:
    error detection or correction encoding first information to be distributed in a Markup language description format used in a multimedia network, at least a portion in a header in the information to be distributed being error detection or correction encoded with higher redundancy than an entity in the information to be distributed; and
    multiplexing the encoded first information in a broadcast signal, and transmitting the multiplexed signal,
    wherein said multiplexing step is also arranged so as to multiplex second information including character information into the broadcast signal without using the Markup language description format to transmit the thus-multiplexed signal, wherein the first information has a data format thereof which includes a format that complies with a data format of the second information, and wherein the data format forms an error correction code, the first information is transmitted as an entity in the data format of the second information, and the header of the first information forms another error correction code.

11. An information processing method comprising the steps of:
    inputting first information to be distributed in a Markup language description format used in a multimedia network; and
    multiplexing the first information in a broadcast signal and transmitting the multiplexed signal, wherein a portion of a header in the first information is transmitted at least a plurality of number of times while an entity in the first information is transmitted, wherein said multiplexing step is also arranged so as to multiplex second information including character information into the broadcast signal without using the Markup language description format to transmit the thus-multiplexed signal, wherein the first information has a data format thereof which includes a format that complies with a data format of the second information, and wherein the data format forms an error correction code, the first information is transmitted as an entity in the data format of the second information, and the header of the first information forms another error correction code.

12. An information processing method comprising the steps of:
    error detection or correction encoding first information to be distributed in a Markup language description format used in a multimedia network; and
    multiplexing the encoded first information in a broadcast signal, and transmitting the multiplexed signal, wherein a plurality of kinds of information are able to be transmitted as an entity in the first information, wherein different error detection or correction ability is used in correspondence with the kind of information, wherein said multiplexing step is also arranged so as to multiplex second information including character information into the broadcast signal without using the Markup language description format to transmit the thus-multiplexed signal, wherein the first information has a data format thereof which includes a format that complies with a data format of the second information, and wherein the data format forms an error correction code, the first information is transmitted as an entity in the data format of the second information, and the header of the first information forms another error correction code.

13. An information processing apparatus comprising:
    a) a reception unit, arranged to receive a first broadcast signal obtained by multiplexing first information to be distributed in a Markup language description format used in a multimedia network and a first error check code added for the information to be distributed, wherein said reception unit is also arranged so as to receive a second broadcast signal provided by multiplexing second information including character information distributed without using the Markup language description format, and a second error check code, and wherein the first information has a data format thereof which includes a format that complies with a data format of the second information, and wherein the data format forms an error correction code, the first information is transmitted as an entity in the data format of the second information, and the header of the first information forms another error correction code; and
    b) a processing unit, arranged to perform error correction or detection processing of the first information using the first error check code,
    wherein said processing unit is also arranged so as to execute the error correction or detection processing on the second information by using the second error check code, when the second broadcast signal is received by said reception unit.

14. The apparatus according to claim 13, wherein the first information is character information, and wherein said apparatus further comprises an output unit, arranged to output the character information processed by said processing unit to a display unit.

15. The apparatus according to claim 14, wherein the first information includes image information, and said display unit displays a message indicating reception of the image information when the image information is received.

16. The apparatus according to claim 14, further comprising;
   a storage unit, arranged to store the received information; and
   an informing unit, arranged to transmit that the received information is stored in said storage unit and has not been output to an external device.

17. The apparatus according to claim 13, wherein the Markup language description format is an HTML (HyperText Markup Language) format.

18. An information processing apparatus comprising:
   a) a reception unit, arranged to receive a broadcast signal obtained by multiplexing information to be distributed in a description format, used in a multimedia network, as an entity of a data format used for multiplexing first character information in an FM audio signal; and
   b) a display unit, arranged to display the first character information,
   wherein said display unit displays second character information when said reception unit receives a broadcast signal obtained by multiplexing the second character information.

19. The apparatus according to claim 18, wherein when the information to be distributed has image information, said display unit displays a message indicating reception of the image information.

20. The apparatus according to claim 18, wherein the information to be distributed is information in an HTML (HyperText Markup Language) format.

21. An information processing method comprising the steps of:
   receiving a first broadcast signal obtained by multiplexing first information to be distributed in a Markup language description format used in a multimedia network and a first error check code added for the information to be distributed, wherein said receiving step is also arranged so as to receive a second broadcast signal provided by multiplexing second signal including character information distributed without using the Markup language description format, and a second error check code, wherein the first information has a data format thereof which includes a format that complies with a data format of the second information, and wherein the data format forms an error correction code, the first information is transmitted as an entity in the data format of the second information, and the header of the first information forms another error correction code; and
   performing error correction or detection processing using the first error check code,
   wherein said performing step is also arranged so as to perform error correction or detection processing on the second information by using the second error check code, when the second broadcast signal is received in said receiving step.

22. An information processing method comprising the steps of:
   receiving a broadcast signal obtained by multiplexing information to be distributed in a description format, used in a multimedia network, as an entity of a data format used for multiplexing first character information in an FM audio signal; and
   displaying second character information using a display unit, arranged to display the first character information when said receiving step receives a broadcast signal obtained by multiplexing the character information.

* * * * *